(12) United States Patent
Harter et al.

(10) Patent No.: US 10,430,378 B1
(45) Date of Patent: Oct. 1, 2019

(54) FAST CONTAINER DISTRIBUTION WITH STORAGE ACCELERATION

(71) Applicant: Tintri by DDN, Inc., Chatsworth, CA (US)

(72) Inventors: Tyler Harter, La Crosse, WI (US);
Rose F. Liu, San Jose, CA (US);
Brandon W. Salmon, Menlo Park, CA (US)

(73) Assignee: Tintri by DDN, Inc., Chatsworth, CA (US)

( * ) Notice: Subject to any disclaimer, the term of this patent is extended or adjusted under 35 U.S.C. 154(b) by 127 days.

(21) Appl. No.: 15/269,395

(22) Filed: Sep. 19, 2016

(51) Int. Cl.
*G06F 16/00* (2019.01)
*G06F 16/11* (2019.01)
*G06F 11/14* (2006.01)
*G06F 16/16* (2019.01)

(52) U.S. Cl.
CPC ........ *G06F 16/128* (2019.01); *G06F 11/1469* (2013.01); *G06F 16/16* (2019.01); *G06F 2201/84* (2013.01)

(58) Field of Classification Search
CPC ............ G06F 11/1469; G06F 17/3015; G06F 17/30067; G06F 11/01435; G06F 3/065; G06F 17/30212; G06F 17/30088; G06F 17/3012; G06F 17/30174; G06F 16/128; G06F 16/16; G06F 2201/84; G06F 16/00; G06F 11/1435; G06F 2009/45595; G06F 11/1451; G06F 17/30; G06F 21/53; G06F 9/45558; G06F 8/60; G06F 2009/4557; H04L 67/1095; H04L 63/1491; H04L 63/101
See application file for complete search history.

(56) References Cited

U.S. PATENT DOCUMENTS

| | | | | |
|---|---|---|---|---|
| 7,562,078 B1 * | 7/2009 | Yadav | ..................... | G06F 16/10 707/999.202 |
| 8,904,081 B1 * | 12/2014 | Kulkarni | ................. | G06F 3/065 711/6 |
| 9,043,567 B1 * | 5/2015 | Modukuri | ............... | G06F 16/00 711/162 |
| 9,069,710 B1 * | 6/2015 | Modukuri | ........... | G06F 11/2051 711/170 |
| 10,031,672 B2 * | 7/2018 | Wang | .................. | G06F 16/1748 |
| 2005/0246397 A1 * | 11/2005 | Edwards | ................. | G06F 16/10 711/114 |

(Continued)

OTHER PUBLICATIONS

Harter et al. Slacker: Fast Distribution with Lazy Docker Containers. Proceedings of the 14th USENIX Conference on File and Storage Technologies (FAST /16). Feb. 22-25, 2016, Santa Clara, CA.

(Continued)

*Primary Examiner* — Anh Ly
(74) *Attorney, Agent, or Firm* — Van Pelt, Yi & James LLP

(57) ABSTRACT

Storage system accelerated techniques to distribute and run containerized applications are disclosed. In various embodiments, an indication to run a container is received. A snapshot identifier comprising an image data associated with the container is used to create a clone based on a snapshot with which the snapshot identifier is associated. The clone is used to store data associated with at least a topmost layer of the container.

18 Claims, 15 Drawing Sheets

(56) References Cited

U.S. PATENT DOCUMENTS

| | | | | |
|---|---|---|---|---|
| 2005/0246503 | A1* | 11/2005 | Fair | G06F 17/30067 711/147 |
| 2006/0184821 | A1* | 8/2006 | Hitz | G06F 3/0607 714/6.1 |
| 2010/0122248 | A1* | 5/2010 | Robinson | G06F 9/485 718/1 |
| 2010/0157641 | A1* | 6/2010 | Shalvi | G11C 16/349 365/45 |
| 2011/0161496 | A1* | 6/2011 | Nicklin | G06Q 30/06 709/226 |
| 2012/0317236 | A1* | 12/2012 | Abdo | H04L 67/02 709/219 |
| 2013/0054927 | A1* | 2/2013 | Raj | G06F 3/0608 711/170 |
| 2013/0325806 | A1* | 12/2013 | Bachar | G06F 16/128 707/638 |
| 2013/0325808 | A1* | 12/2013 | Bachar | G06F 16/2237 707/640 |
| 2015/0142750 | A1* | 5/2015 | Mutalik | G06F 11/1451 707/654 |
| 2015/0143064 | A1* | 5/2015 | Bhargava | G06F 11/1451 711/162 |
| 2016/0150047 | A1* | 5/2016 | O'Hare | G06F 3/0619 713/168 |
| 2016/0350006 | A1* | 12/2016 | Wang | G06F 16/1748 |
| 2017/0031769 | A1* | 2/2017 | Zheng | G06F 11/1446 711/162 |
| 2017/0068472 | A1* | 3/2017 | Periyagaram | G06F 16/128 |
| 2017/0099101 | A1* | 4/2017 | Pepper | H04B 10/801 |
| 2017/0264684 | A1* | 9/2017 | Spillane | H04L 67/1095 707/E17.01 |
| 2017/0366606 | A1* | 12/2017 | Ben-Shaul | G06F 3/0619 711/145 |

OTHER PUBLICATIONS

Merchant et al. Maestro: quality-of-service in large disk arrays. ICAC '11, Jun. 14-18, 2011, Karlsruhe, Germany.

Modern Http Benchmarking Tool. https://github.com/wg/wrk/, 2015.

Nathuji et al. Q- Clouds: Managing Performance Interference Effects for QoS-Aware Clouds. EuroSys '10, Apr. 13-16, 2010, Paris, France.

Nicolae et al. Going back and forth: Efficient multideployment and multisnapshotting on clouds. In Proceedings of the 20th international symposium on High performance distributed computing, pp. 147-158. ACM, 2011.

O'Neil et al. The Log-Structured Merge-Tree (LSM-Tree). Acta Informatica, 33(4):351-385, 1996.

Paul Van Der Ende. Fast and Easy Integration Testing with Docker and Overcast. http://blog.xebia.com/2014/10/13/fast-and-easy-integration- testing-with- docker-and-overcast/, 2014.

pgbench. http://www.postgresql.org/docs/devel/static/pgbench.html, Sep. 2015.

Saff et al. An Experimental Evaluation of Continuous Testing During Development. In ACM SIGSOFT Software Engineering Notes, vol. 29, pp. 76-85. ACM, 2004.

Sapuntzakis et al. Optimizing the Migration of Virtual Computers. SIGOPS Oper. Syst. Rev., 36(SI):377-390, Dec. 2002.

Shue et al. Performance Isolation and Fairness for Multi-Tenant Cloud Storage. In Proceedings of the 10th Symposium on Operating Systems Design and Implementation (OSDI '12), Hollywood, California, Oct. 2012.

spoon.net. Containerized Selenium Testing. https:// blog.spoon.net/running-a-selenium-grid- using- containers/, 2015.

Sunil Shah. Integration Testing with Mesos, Chronos and Docker. http://mesosphere.com/blog/2015/03/26/ integration-testing-with- mesos-chronos-docker/, 2015.

The Linux Community. LXC—Linux Containers, 2014.

Thereska et al. IOFlow: A Software-Defined Storage Architecture. In Proceedings of the 24th ACM Symposium on Operating Systems Principles (SOSP '13), Farmington, Pennsylvania, Nov. 2013.

Tintri VMstore(tm) T600 Series. http://www.tintri.com/sites/default/files/field/pdf/document/t600- datasheet_0.pdf, 2013.

Tintri Operating System. https://www.tintri.com/sites/default/files/field/pdf/whitepapers/tintri- os- datasheet-150701t10072.pdf, 2015.

Tyler Harter. HelloBench. http://research.cs.wisc.edu/adsl/Software/hello-bench/, 2015.

Verghese et al. Performance Isolation: Sharing and Isolation in Shared-memory Multiprocessors. In Proceedings of the 8th International Conference on Architectural Support for Programming Languages and Operating Systems (ASPLOS VIII), pp. 181-192, San Jose, California, Oct. 1998.

Verma et al. Large-scale cluster management at Google with Borg. In Proceedings of the European Conference on Computer Systems (EuroSys), Bordeaux, France, 2015.

Wachs et al. Argon: Performance Insulation for Shared Storage Servers. In Proceedings of the 5th USENIX Symposium on File and Storage Technologies (FAST '07), San Jose, California, Feb. 2007.

Wang et al. Towards optimization-safe systems: Analyzing the impact of undefined behavior. In Proceedings of the Twenty-Fourth ACM Symposium on Operating Systems Principles, pp. 260-275. ACM, 2013.

Wartel et al. Image distribution mechanisms in large scale cloud providers. In Cloud Computing Technology and Science (Cloud-Com), 2010 IEEE Second International Conference on, pp. 112-117. IEEE, 2010.

Weiss et al. ANViL: Advanced Virtualization for Modern Non-Volatile Memory Devices. In Proceedings of the 13th USENIX Conference on File and Storage Technologies (FAST '15), Santa Clara, CA, Feb. 2015.

Wu et al. TotalCOW: Unleash the Power of Copy-On-Write for Thin-provisioned Containers. In Proceedings of the 6th Asia-Pacific Workshop on Systems, APSys '15, pp. 15:1-15:7, New York, NY, USA, 2015. ACM.

Yang et al. Split-level I/O Scheduling. In Proceedings of the 25th Symposium on Operating Systems Principles, SOSP '15, pp. 474-489, New York, NY, USA, 2015. ACM.

Zhang et al. CPI2: CPU Performance Isolation for Shared Compute Clusters. Eurosys '13. Apr. 15-17, 2013, Prague, Czech Republic.

Zhu et al. Twinkle: A Fast Resource Provisioning Mechanism for Internet Services. In INFOCOM, 2011 Proceedings IEEE, pp. 802-810. IEEE, 2011.

Adams et al. A Comparison of Software and Hardware Techniques for x86 Virtualization. In Proceedings of the 13th International Conference on Architectural Support for Programming Languages and Operating Systems (ASPLOS XXIII), Seattle, Washington, Mar. 2008.

Andres et al. SnowFlock: Rapid Virtual Machine Cloning for Cloud Computing. In Proceedings of the 4th ACM European conference on Computer systems, pp. 1-12. ACM, 2009.

Angel et al. End-to-end Performance Isolation Through Virtual Datacenters. 11th USENIX Symposium on Operating Systems Design and Implementation (OSDI 2014).

Aravind Narayanan. Tupperware: Containerized Deployment at Facebook. http://www.slideshare.net/Docker/ aravindnarayanan-facebook140613153626phpapp02-37588997, 2014.

Arcangeli et al. Increasing memory density by using KSM. In Proceedings of the linux symposium, pp. 19-28, 2009.

Arpaci-Dusseau et al. Operating Systems: Three Easy Pieces. Arpaci-Dusseau Books, 0.91 edition, May 2015. (1 of 8).

Arpaci-Dusseau et al. Operating Systems: Three Easy Pieces. Arpaci-Dusseau Books, 0.91 edition, May 2015. (2 of 8).

Arpaci-Dusseau et al. Operating Systems: Three Easy Pieces. Arpaci-Dusseau Books, 0.91 edition, May 2015. (3 of 8).

Arpaci-Dusseau et al. Operating Systems: Three Easy Pieces. Arpaci-Dusseau Books, 0.91 edition, May 2015. (4 of 8).

Arpaci-Dusseau et al. Operating Systems: Three Easy Pieces. Arpaci-Dusseau Books, 0.91 edition, May 2015. (5 of 8).

Arpaci-Dusseau et al. Operating Systems: Three Easy Pieces. Arpaci-Dusseau Books, 0.91 edition, May 2015. (6 of 8).

Arpaci-Dusseau et al. Operating Systems: Three Easy Pieces. Arpaci-Dusseau Books, 0.91 edition, May 2015. (7 of 8).

Arpaci-Dusseau et al. Operating Systems: Three Easy Pieces. Arpaci-Dusseau Books, 0.91 edition, May 2015. (8 of 8).

(56) References Cited

OTHER PUBLICATIONS

Axboe et al. blktrace(8)—Linux man page. http://linux.die.net/man/8/blktrace, 2006.

Bugnion et al. Disco: Running Commodity Operating Systems on Scalable Multiprocessors. In Proceedings of the 16th ACM Symposium on Operating Systems Principles (SOSP '97), pp. 143-156, Saint-Malo, France, Oct. 1997.

Carl A. Waldspurger. Memory Resource Management in VMware ESX Server. In Proceedings of the 5th Symposium on Operating Systems Design and Implementation (OSDI '02), Boston, Massachusetts, Dec. 2002.

Dave Lester. All about Apache Aurora. https://blog.twitter.com/2015/all-about-apache-aurora, 2015.

Dirk Merkel. Docker: lightweight Linux containers for consistent development and deployment. Linux Journal, Issue 239, Mar. 2014.

Docker Hub. https://hub.docker.com/u/library/, 2015.

Drew Houston. https://www.youtube.com/watch?v=NZINmtuTSu0&t=1278, 2014.

Elson et al. Handling Flash Crowds from Your Garage. In USENIX 2008 Annual Technical Conference, ATC'08, pp. 171-184, Berkeley, CA, USA, 2008. USENIX Association.

Git Manpages. git-bisect(1) Manual Page. https://www.kernel.org/pub/software/scm/git/docs/git-bisect.html, 2015.

Gupta et al. Enforcing Performance Isolation Across Virtual Machines in Xen. In Proceedings of the ACM/IFIP/USENIX 7th International Middleware Conference (Middleware'2006), Melbourne, Australia, Nov. 2006.

Hibler et al. Fast, Scalable Disk Imaging with Frisbee. In USENIX Annual Technical Conference, General Track, pp. 283-296, 2003.

Hindman et al. Mesos: A Platform for Fine-Grained Resource Sharing in the Data Center. In NSDI, vol. 11, pp. 22-22, 2011.

John Pescatore. Nimda Worm Shows You Can't Always Patch Fast Enough. https://www.gartner.com/doc/340962, Sep. 2001.

Kerrisk et al. namespaces(7)—overview of Linux namespaces. https://web-beta.archive.org/web/20141010031345/http://man7.org:80/linux/man-pages/man7/namespaces.7.html, 2014.

Kubernetes. http://kubernetes.io, Aug. 2014.

Lu et al. Physical Disentanglement in a Container-Based File System. In Proceedings of the 11th Symposium on Operating Systems Design and Implementation (OSDI '14), Broomfield, CO, Oct. 2014.

Matt Soldo. Upgraded Autobuild System on Docker Hub. http://blog.docker.com/2015/11/upgraded-autobuild-docker-hub/, 2015.

* cited by examiner

FAST CONTAINER DISTRIBUTION WITH STORAGE ACCELERATION

BACKGROUND OF THE INVENTION

Containers, as driven by the popularity of solutions such as the Docker™ software containerization platform provided by Docker, Inc., have recently emerged as a lightweight alternative to hypervisor-based virtualization. Containers are essentially just processes that enjoy virtualization of all resources, not just CPU and memory; as such, there is no intrinsic reason starting a container should be more costly than starting a regular process.

Unfortunately, starting containers is much slower in practice due to file-system provisioning bottlenecks. Whereas initialization of network, compute, and memory resources is relatively fast and simple (e.g., zeroing memory pages), a containerized application requires a fully initialized file system, containing application binaries, a complete Linux distribution, and package dependencies. Deploying a container in a Docker™ or Google Borg™ cluster typically involves copying packages over the network, unpacking these to a local directory, and using that directory as the root file system for the new container. Median container startup latency has been seen to be 25 seconds in a recent Google Borg™ study.

If startup time can be improved, a number of opportunities arise: applications can scale instantly to handle flash-crowd events, cluster schedulers can frequently rebalance nodes at low cost, software upgrades can be rapidly deployed when a security flaw or critical bug is fixed, and developers can interactively build and test distributed applications.

BRIEF DESCRIPTION OF THE DRAWINGS

Various embodiments of the invention are disclosed in the following detailed description and the accompanying drawings.

DETAILED DESCRIPTION

Figure 1:
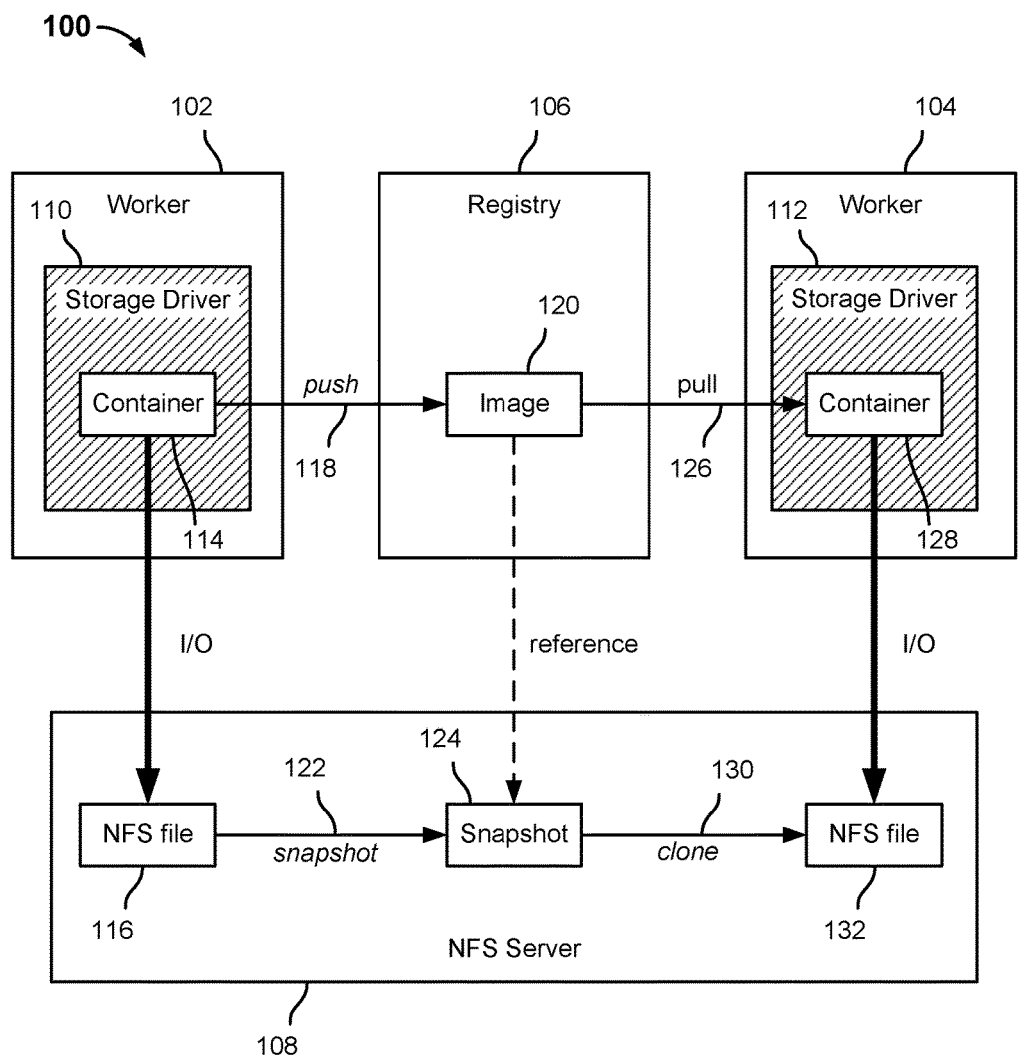
FIG. 1 is a block diagram illustrating an embodiment of a containerization storage system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A containerization storage driver that achieves fast container distribution at least in part by utilizing snapshot and clone capabilities of a backend storage system, such as Tintri's VMstore™, at one or more layers of a Docker™ or other containerization set of layers or other stack is disclosed. In various embodiments, the cost of particularly expensive containerization platform functions may be reduced dramatically. In various embodiments, changes may be made to the loopback kernel module of a Linux or similar operating system in order to achieve better cache performance. In various embodiments, "lazy" cloning and/or snapshot caching techniques may be used to overcome limitations of the containerization platform/framework. In various embodiments, rather than pre-fetching whole container images, which typically include multiple layers each comprising associated data, a containerization storage layer as disclosed herein may lazily pull image data only as necessary, drastically reducing network I/O.

In various embodiments, one or more of the following may be performed and/or provided:

a. Backend storage system services, such as Tintri VMstore™ snapshots and cloning (issued through REST API), may be used to speed up container startup by eliminating data copies. In some embodiments, push and pull operations are performed more quickly at least in part by performing copy-on-write ("COW") for Docker™ Diff and ApplyDiff primitive operations. Instead of doing full physical copies over the network, storage accelerated snapshots are taken and only the snapshot identifiers (small amount of metadata) are transferred. When data is needed, a storage-accelerated clone can be instantiated using the snapshot-id, where the storage accelerated cloning operation also does not require data copies.

b. Snapshot identifiers may be stored in Docker registries, instead of the data required to build an instance of a container and/or layer. Storing snapshot-ids in registries, such as Docker registries, instead of the full data required to build an instance of a container and/or layer, may significantly reduce the storage capacity and performance requirements (and cost) on the storage systems/devices used to hold the registries.

c. Use a lazy clone technique to optimize latency and reduce the work needed on Docker Create (or similar operations to create a container and/or layer) when images consist of many layers. Docker layers depend on each other, but in various embodiments container layers are stored in a storage system, such as a Tintri VMstore™, in a manner such that each layer is stand-alone (i.e., doesn't depend on other layers being mounted). The existing Docker framework does not expect standalone layers and as a result fetches all the layers when an image is "pulled" from the registry, even though the first (topmost) layer is sufficient when using storage techniques as disclosed herein. In various embodiments, when using techniques as disclosed herein layers other than the topmost layer are redundant. In light of this, in various embodiments lazy clone techniques as used to eliminate the need for redundant clones on every ApplyDiff operation, while allowing the existing Docker framework to be used without modifications. For example, in some embodiments, to perform an ApplyDiff operation a clone operation is only performed if/when Docker calls the "Get" function (or method) on a layer.

d. Use a snapshot caching technique per layer to optimize when multiple containers are created from the same image. In various embodiments, a containerization storage driver as disclosed herein implements the Docker "Create" method with a snapshot immediately followed by a clone. If many containers are created from the same image, Create will be called many times on the same layer. Instead of doing a snapshot for each Create, in various embodiments a containerization storage driver as disclosed herein only does it the first time, reusing the snapshot ID subsequent times. The snapshot cache for a layer is invalidated if the layer is mounted (once mounted, the layer could change, making the snapshot outdated).

e. Technique to allow kernel page cache sharing across files. In various embodiments, the kernel loopback module is modified to track block level changes to layers. If layers share the same parent layer and are reading a block that is not modified in the current layer, the read will get redirected to the parent layer. In this way, higher layers can populate and utilize a lower (parent) layer's page cache, requiring fewer I/O operations.

FIG. 1 is a block diagram illustrating an embodiment of a containerization storage system and environment. In the example shown, containerization storage system and environment 100 includes a plurality of worker nodes, such as Docker™ workers, represented in FIG. 1 by workers 102 and 104. Such as set of workers may be referred to in Docker™ nomenclature as a "Docker cluster". Each worker may be a set of processes and modules running on one or more physical computer systems. For example, each may include on or more Docker™ daemons configured to build and operate instances of containers. Workers 102 and 104 have access to a Docker registry 106 configured to receive, store, and provide container images as specified by the Docker platform and protocol. In the example shown, each worker 102, 104 includes a containerization storage driver 110, 112 configured to provide container data storage as disclosed herein. In various embodiments, workers 102, 104 and associated containerization storage drivers 110, 112 have access to a shared storage system 108, such as a Tintri VMstore™ or other NFS (or other) server. In the example shown, a container, such as container 114, is associated with a single NFS file 116 stored on shared storage system 108.

Typically, a Docker container is uploaded to a Docker registry via a "push" operation, in which metadata and underlying container data (e.g., web server image, application binary, etc.) are uploaded to the registry. By contrast, in the example shown, underlying image data is not uploaded to the Docker registry 106. Instead, to "push" 118 an image 120 of container 114 to the registry 106, storage driver 110 requests that a snapshot operation 122 be performed by storage system 108 to create a snapshot 124 of NFS file 116 underlying container 114. A snapshot identifier ("snapshot ID") that uniquely identifies snapshot 124 is returned to storage driver 110. Instead of including actual container (layer) data in the image 120 as pushed to the Docker registry 106, storage driver 110 includes the snapshot ID that references snapshot 124 on storage system 108.

Subsequently, to execute a "pull" operation 126 to create a container instance 128 at worker 104, storage driver 112 uses standard Docker (or other) commands to obtain image 120 from registry 106. Unlike the conventional approach, in which the image contains the data needed to build each layer of container 128, using techniques disclosed herein the image 120 includes for each layer a corresponding snapshot ID. In this example shown in FIG. 1, storage driver 112 uses a snapshot ID associated with snapshot 124, obtained from the data portion of image 120, to request that storage system 108 perform a clone operation 130 to create a clone 132 based on snapshot 124. In various embodiments, snapshot 124 represents and embodies a state of NFS file 116 at a time when snapshot 124 was taken. In various embodiments, snapshot 124 may comprise pointers or other metadata, which may point directly or indirectly to corresponding block-level data stored on and/or otherwise accessible via storage system 108. In various embodiments, one or both of the snapshot operation 122 and the clone operation 130 may require only that minimal data structures and associated metadata be generated on storage system 108, greatly reducing the time to build an instance of a container based on an image created and stored on a registry such as registry 106, in the manner disclosed herein, and eliminating the need to transfer underlying container/layer data via a network or other connections between/among the workers, such as workers 102 and 104, comprising a Docker cluster and a Docker registry, such as registry 106.

Figure 2:
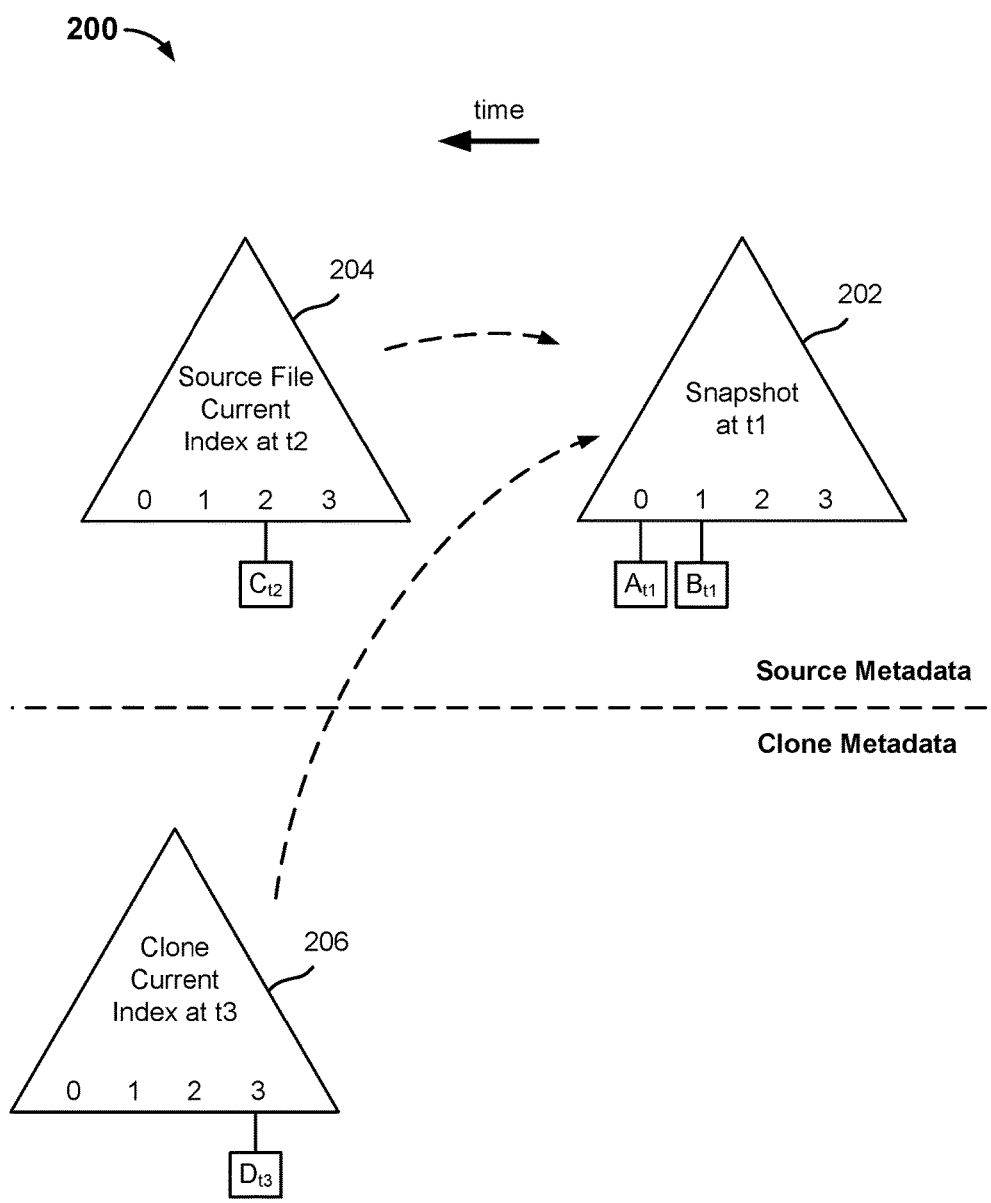
FIG. 2 is a block diagram illustrating an embodiment of a storage system having snapshot and clone capabilities.

FIG. 2 is a block diagram illustrating an embodiment of a storage system having snapshot and clone capabilities. In various embodiments, a storage system used to store Docker or other container data, such as storage system 108 of FIG. 1, may create, store, and/or provide snapshots and/or clones as shown in FIG. 2. In the example shown, storage system 200, e.g., a Tintri VMstore™, creates and stores a snapshot 202 taken at a time t1. For example, a snapshot such as snapshot 124 may have been taken of a source file such as NFS file 116 in the example shown in FIG. 1. In this example, which is highly simplified to illustrate the principles of operation disclosed herein, the snapshot 202 includes pointers to block-level data associated with offsets "0" and "1". Subsequent to time t1 at which snapshot 202 was taken, other data comprising the live NFS (or other) file based on which snapshot 202 was created may be changed. In the example shown, a current index 204 associated with the source file (e.g., a current 'snapshot' index, a current 'live' index, etc.) is shown in a state as of time t2, reflecting a change to data associated with a third offset "2" since the snapshot 202 was created at time t1. In the example shown, at a time subsequent to t1 a clone, represented in FIG. 2 by index 206, was created. In the state shown in FIG. 2, associated with a time t3, the block-level data associated with offsets 0 and 1 of the file associated with index 206 (i.e., the clone) has not been changed, and still points back to the snapshot 202. However, new data associated with offset "3" has been written in the clone.

In various embodiments, each of the source file associated with current index 204 and the clone file associated with current index 206 may point back to the shared snapshot 202, e.g., to read data associated with offsets with respect to which changes have not been made since the time of the snapshot. As to such data, the indexes 202, 204, and 206 may all share the same pointer, stored in or otherwise associated with snapshot 202, pointing to a single instance of metadata that indicates where on physical storage the corresponding block-level data is stored. Copy-on-write may be performed at the block level, only with respect to offsets that are written to subsequent to the snapshot having been taken. Using snapshot and cloning techniques as disclosed herein to perform container image "push" and "pull" operations enables container images to be uploaded to and downloaded from a Docker or other registry without transferring container/layer data, and may enable an instance of a container to be built and deployed very quickly.

Figure 3:
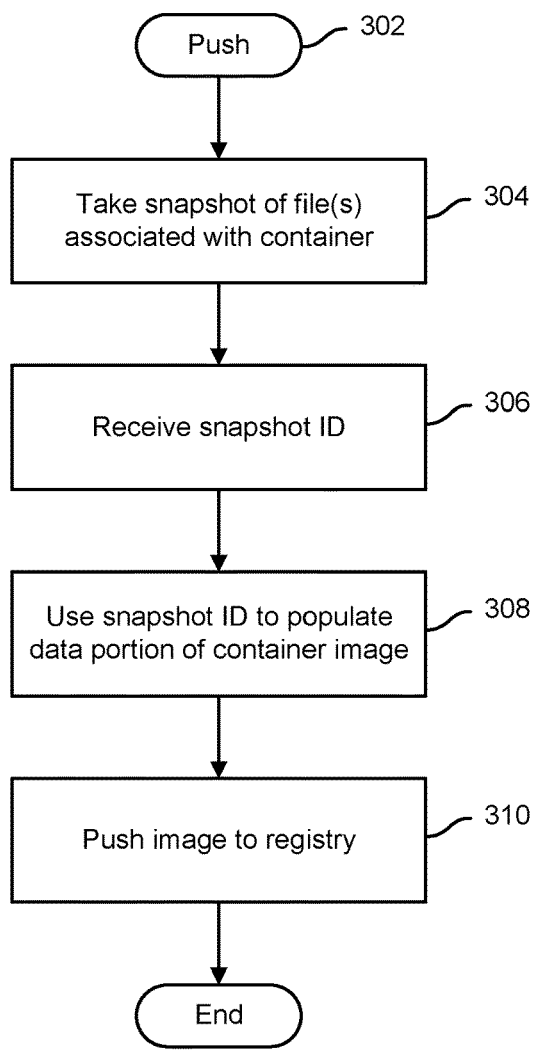
FIG. 3 is a flow chart illustrating an embodiment of a process to push an image of a container to a registry.

FIG. 3 is a flow chart illustrating an embodiment of a process to push an image of a container to a registry. In various embodiments, the process of FIG. 3 may be performed by a containerization storage driver as disclosed herein, such as storage drivers 110, 112 of FIG. 1. In the example shown, to perform a push operation (302) a snapshot is caused to be taken (304) of one or more files associated with the container an image of which is to be pushed to the registry. In various embodiments, a snapshot is taken for one or more volumes or mount points associated with the container (which in some embodiments may map to files on the underlying storage), and the snapshotted image or identifier is then pushed to the registry. In a typical prior art Docker implementation, containers are generally (e.g. using AUFS) composed of layers of images, where top layers depend on data of lower layers. In various embodiments disclosed herein, a single, topmost layer of a container may be stored in a backend storage system, such as a Tintri VMstore™, in such a manner that a snapshot of a single file associated with the topmost layer would be sufficient, standing alone to build and run a corresponding container. In some embodiments, a backend storage system, such as a Tintri VMstore™, maps container volumes to files. Snapshots of files may be taken in a way such that each snapshot includes all data required to mount a container at an associated layer, without requiring any other snapshot or file, unlike in a typical Docker implementation, in which each layer has its own associated file and a unification type file system such as AUFS is used to provide a unified view of multiple files/directories to provide a container. In various embodiments disclosed herein, a snapshot such as snapshot 202 of FIG. 2, or a subsequent snapshot taken at a later time, may alone be sufficient to access data associated with a corresponding container. However, in various embodiments, to avoid requiring that modifications to the underlying Docker or other containerization protocol, platform, and/or components (e.g., the Docker daemon) be made in order to use and benefit from a containerization storage driver as disclosed herein, the container/image structure embodied in the Docker platform and approach is preserved and used without modification.

An image typically will include multiple layers, each having associated therewith a corresponding set of data. In the conventional approach, a unified view and access to container data typically is provided via a so-called "union file system", such as AUFS. A union file system does not store data on disk, but instead uses an underlying file system to provide a unified view of and access to files residing in multiple directories in the underlying file system. A union file system, such as AUFS, may support copy-on-write at the file level of granularity, requiring files in a lower layer of a container's stack of layers to be copied to the top layer before a write is allowed to proceed. To build a container layer, in the conventional approach an associated directory is created, and the layer data is obtained from an image pulled from the Docker registry and stored in the directory.

To push an image to the Docker directory, in the conventional approach, data associated with each layer may be read and included in a corresponding portion of an image as pushed to and stored at the registry.

By contrast, in the example shown in FIG. 3, to perform a push operation (302) a snapshot is taken (304) and an associated snapshot ID is received (306). The snapshot ID is used to populate the data portion(s) of the container image (308) and the container image is pushed to the registry (310). As a result, for each layer only a corresponding snapshot ID, and not the underlying data, is sent to and stored at the registry.

Figure 4:
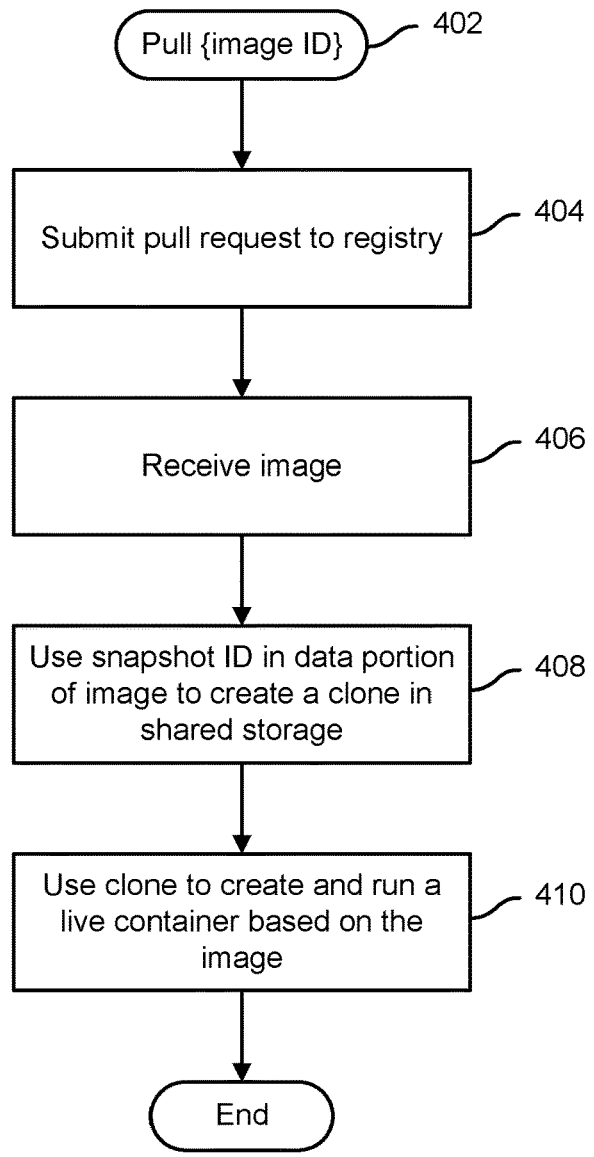
FIG. 4 is a flow chart illustrating an embodiment of a process to pull an image of a container from a registry.

FIG. 4 is a flow chart illustrating an embodiment of a process to pull an image of a container from a registry. In various embodiments, the process of FIG. 4 may be performed by a containerization storage driver as disclosed herein, such as storage drivers 110, 112 of FIG. 1. In the example shown, to perform a pull operation (402), a pull request is sent to the registry (404) and a corresponding image is received (406). A snapshot ID read from a data portion of the image is used to create a clone in shared storage (408). The clone, e.g., the resulting NFS or other file created via a clone operation, such as the one shown in FIG. 2, is used to build and run a live container based on the image (410).

Figure 5:
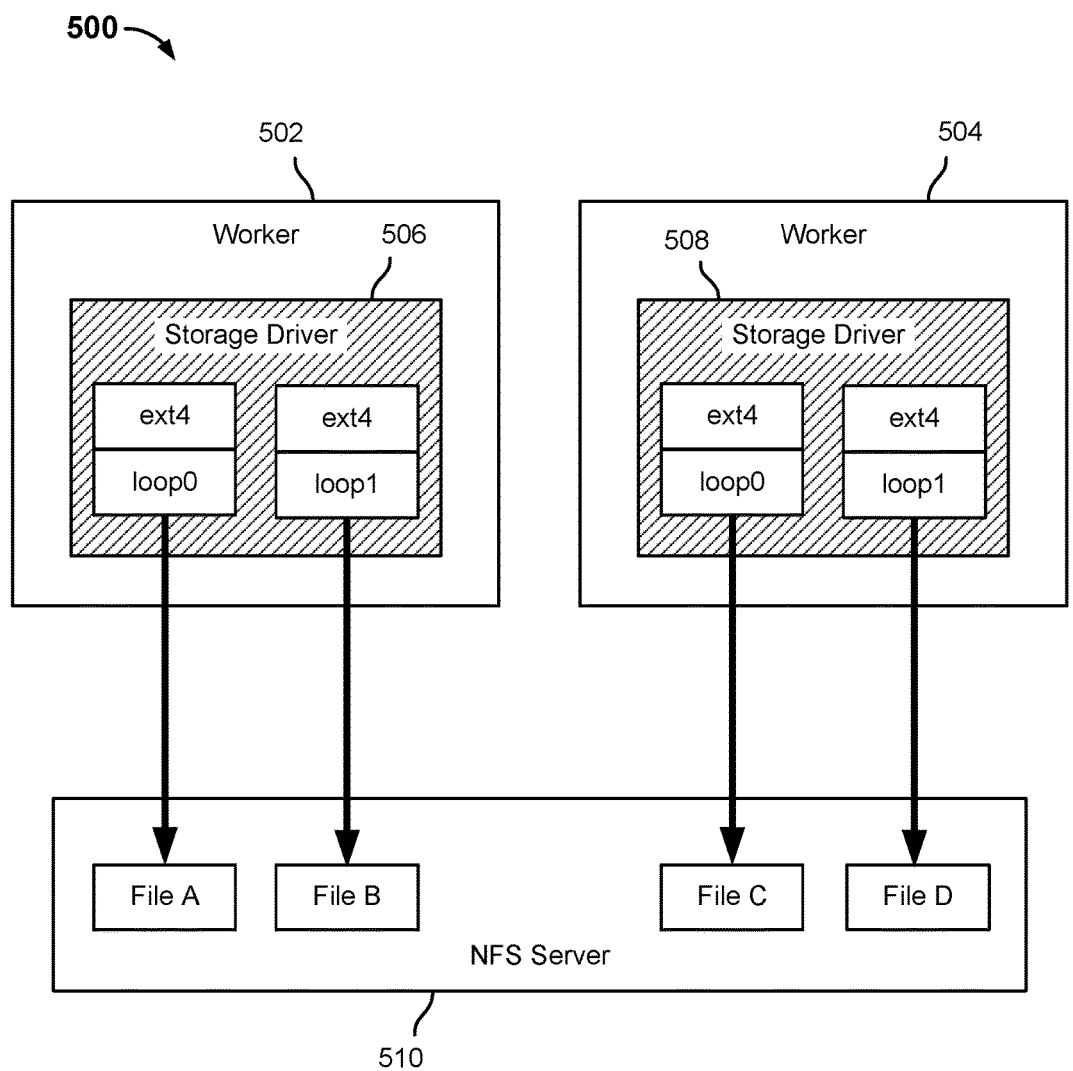
FIG. 5 is a block diagram illustrating an embodiment of a containerization storage system and environment.

FIG. 5 is a block diagram illustrating an embodiment of a containerization storage system and environment. In the example shown, containerization storage system and environment 500 includes a plurality of worker nodes, such as Docker™ workers, represented in FIG. 5 by workers 502 and 504. Workers 502 and 504 have access to a Docker registry, not shown in FIG. 5, configured to receive, store, and provide container images as specified by the Docker platform and protocol. In the example shown, each worker 502, 504 includes a containerization storage driver 506, 508 configured to provide container data storage as disclosed herein. The workers 502, 504 and associated containerization storage drivers 506, 508 have access to a shared storage system 510, such as a Tintri VMstore™ or other NFS (or other) server.

In the example shown, each of the workers 502 and 504 is running two containers, each associated with a corresponding file on NFS server 510 For each container, an associated file system instance (in the example the "ext4" file system is used) and loopback are used to treat each NFS file as a virtual block device, which can be mounted and unmounted as a root file system for a running container.

Figure 6:
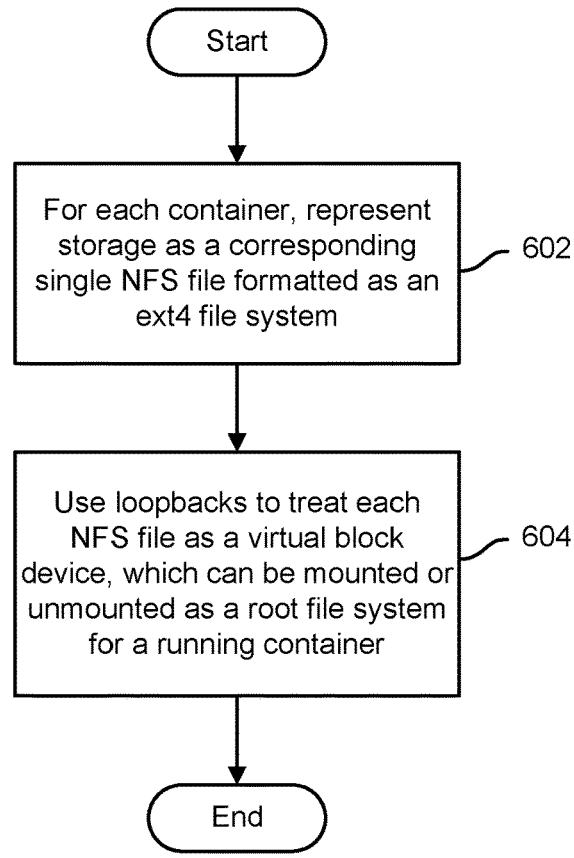
FIG. 6 is a flow chart illustrating an embodiment of a process to store data for a running container.

FIG. 6 is a flow chart illustrating an embodiment of a process to store data for a running container. In various embodiments, the process of FIG. 6 may be implemented by a containerization storage driver, such as storage drivers 506 and 508 of FIG. 5. In the example shown, for each container, the associated container data is represented on backend storage as a single NFS file formatted as an ext4 (or other) file system (602). For each container, an associated loopback is used to treat each NFS file as a virtual block device, which can be mounted or unmounted as a root file system for a running container (604).

Figure 7:
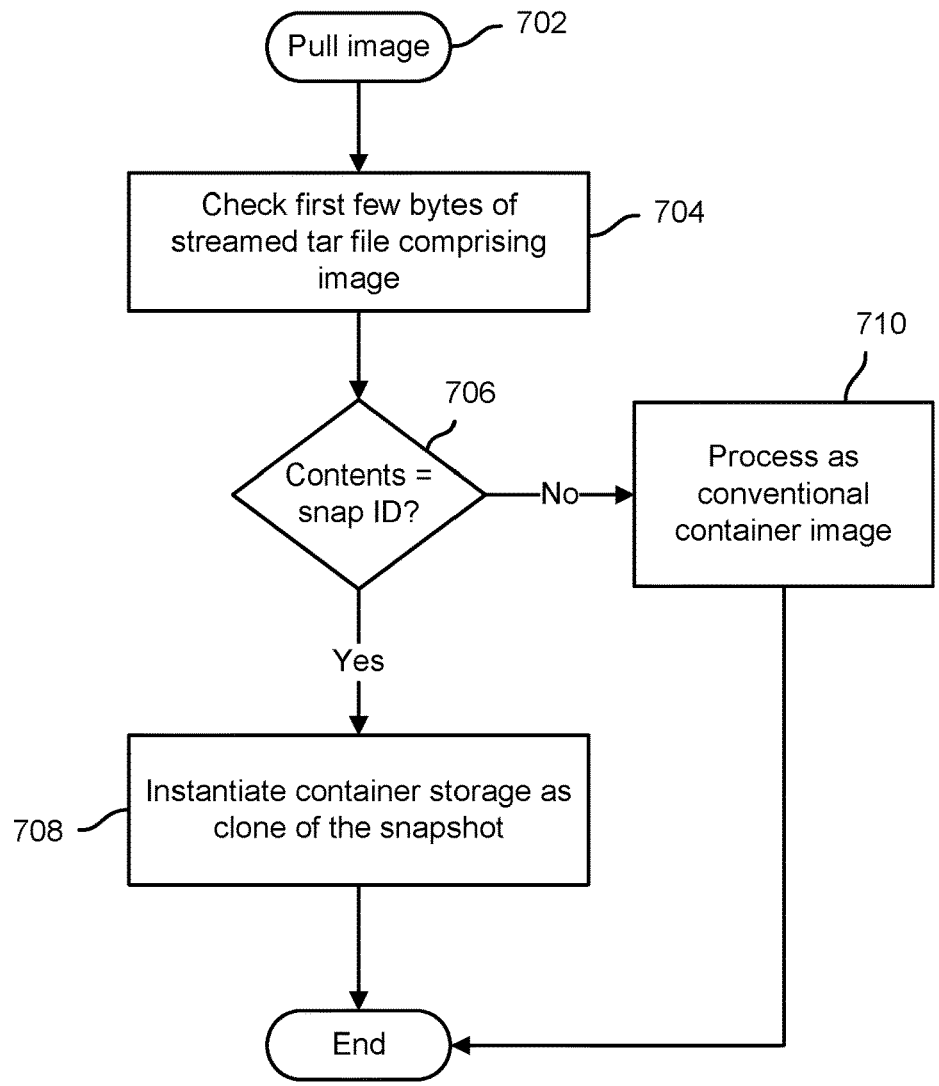
FIG. 7 is a flow chart illustrating an embodiment of a process to pull a container image.

FIG. 7 is a flow chart illustrating an embodiment of a process to pull a container image. In various embodiments, the process of FIG. 7 may be performed by a containerization storage driver as disclosed herein, such as storage drivers 110, 112 of FIG. 1. In particular, the process of FIG. 7 may be implemented to provide a storage driver capable of building a container based on an image comprising a snapshot ID, as disclosed herein, or based on a traditional Docker image in which the data for each layer is included in the image. In the example shown, as image data is received in the course of a pull operation (702), e.g., via a streamed tar or other archive file, the first few bytes of data are checked to determine whether the image contains a snapshot ID as disclosed herein (704). If the image includes a snapshot ID (706) the snapshot ID is used to build the container by creating a clone based on the snapshot, as disclosed herein (708). If the first few bytes do not include a snapshot ID or data indicating that such an ID is included in the image (706), the storage driver revert to a conventional (backwards compatibility) mode of operation, in which data included in the image itself is used to build each successive layer (710).

Figure 8:
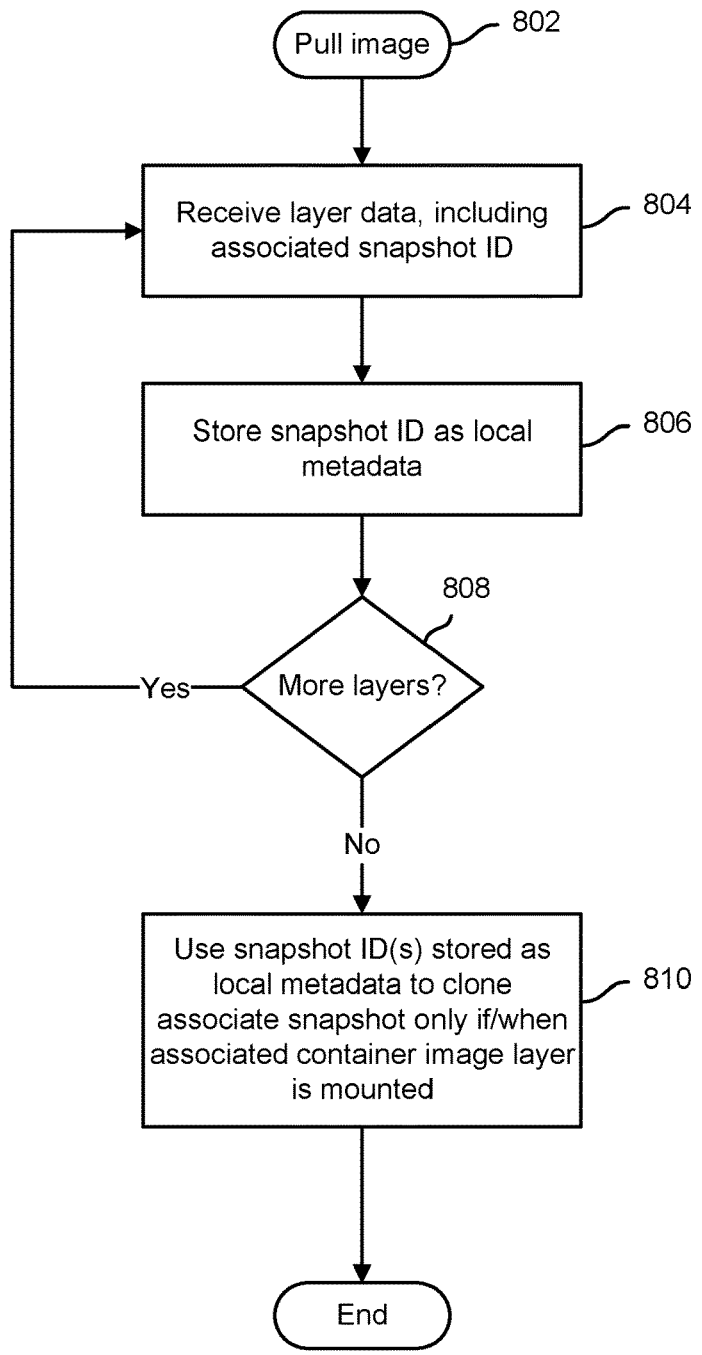
FIG. 8 is a flow chart illustrating an embodiment of a process to process container image data.

FIG. 8 is a flow chart illustrating an embodiment of a process to process container image data. In various embodiments, the process of FIG. 8 may be performed by a containerization storage driver as disclosed herein, such as storage drivers 110, 112 of FIG. 1. To process of FIG. 8 may be used to "lazily" clone files associated with a container/image, e.g., to avoid cloning files that will not be required to be used to run a container. As an image is pulled or otherwise received and processed (802), for each layer, a snapshot ID included in the corresponding image data for that layer is received (804) and stored as local metadata (806). Successive layers are processed in this way (804, 806) until all layers have been processed and for each an associated snapshot ID stored as local metadata (808). If/when a container image layer is mounted, an associated snapshot ID stored as local metadata is used to clone the associated snapshot (810). In various embodiments, each layer of a container represented and stored as disclosed herein has associated therewith a corresponding NFS file that is sufficient, standing alone, to run a container based on that layer. As a result, using the approach shown in FIG. 8 enables a clone to be created only of a layer, such as the topmost layer, that may actually need to be mounted to run an instance of a container based on an image.

In some use cases involving the use and deployment of containers, the same base image may be used to create many slightly different containers. For example, each of a plurality of employees may require a corresponding employee-specific container that is mostly the same as a base image but with minor differences specific to the identity, user level data, and/or needs of that employee. In various embodiments, snapshot caching techniques may be used to avoid creating many snapshots of the same or nearly identical source file.

Figure 9:
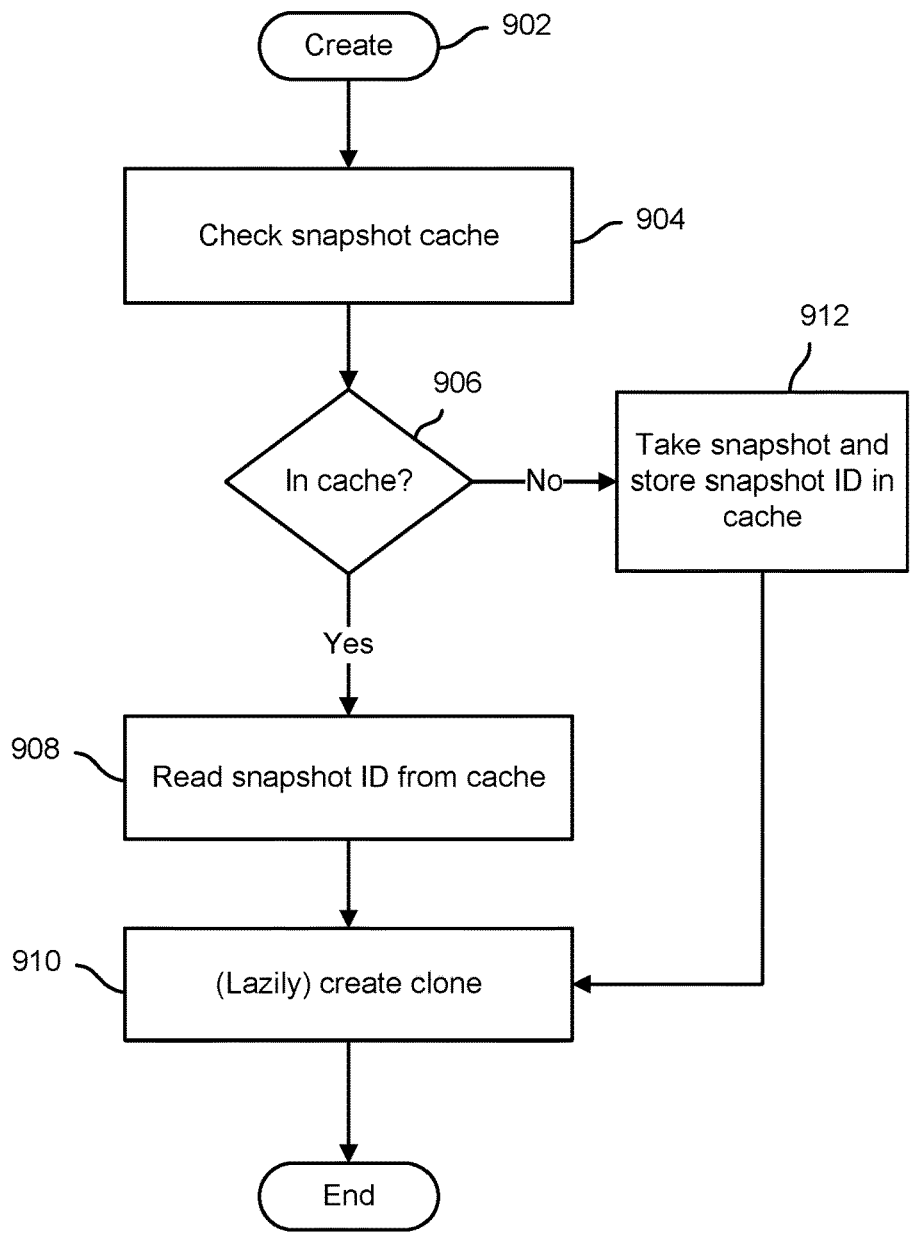
FIG. 9 is a flow chart illustrating an embodiment of a process to use cached snapshot data to build a container.

FIG. 9 is a flow chart illustrating an embodiment of a process to use cached snapshot data to build a container. In the example shown, to create an instance of a container/layer (902) a snapshot cache is checked to determine whether a previously-created snapshot exists (904). If so (906), the snapshot ID of the previously-taken snapshot is read from the cache (908) and used to create a clone based on the snapshot (910). (As indicated in FIG. 9, the clone may be created lazily, i.e., only if/when an associated layer is mounted, as in the example shown in FIG. 8). If there is no existing snapshot in the cache (906), a snapshot is taken and added to the cache (912) and then used (in some embodiments lazily) to create a clone based on the snapshot (910).

Figure 10:
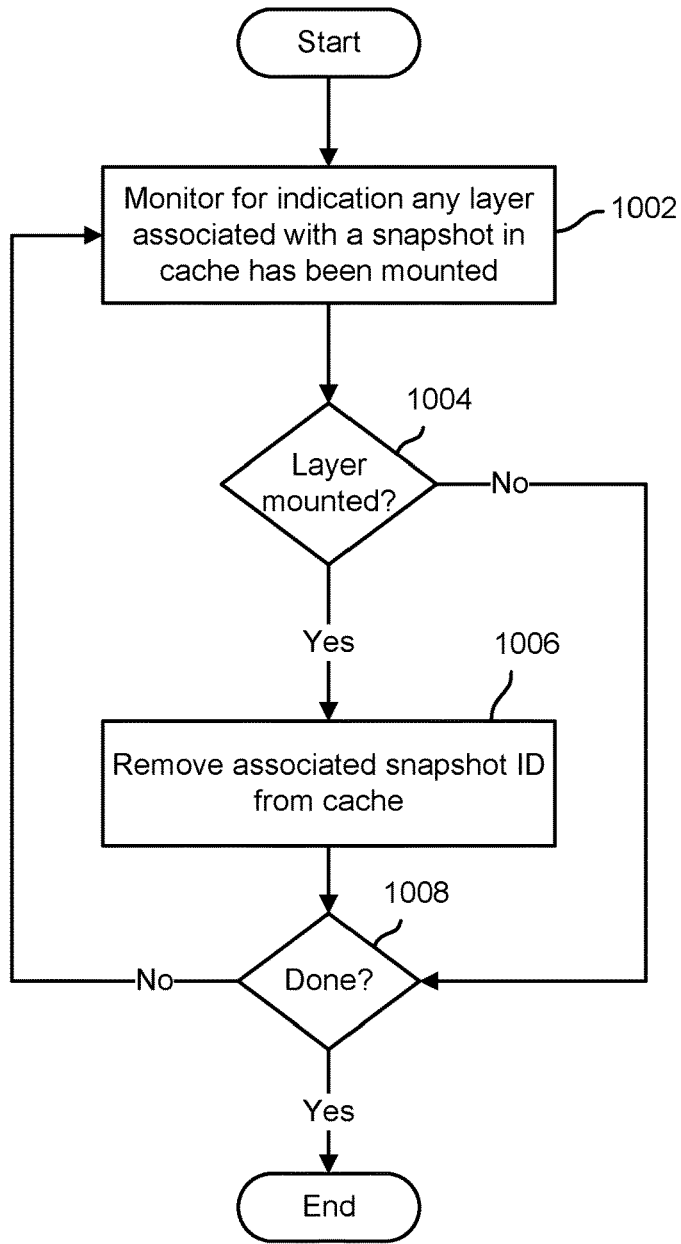
FIG. 10 is a flow chart illustrating an embodiment of a process to invalidate snapshots in a snapshot cache.

FIG. 10 is a flow chart illustrating an embodiment of a process to invalidate snapshots in a snapshot cache. In the example shown, a cache such as described above in connection with FIG. 9 is monitored for an indication that a snapshot associated with a snapshot ID in the cache has been mounted (1002). Once a snapshot has been mounted, e.g., a clone created and used to provide a running container, underlying data may be modified, resulting in the snapshot no longer representing a current state of the file (e.g., see FIG. 2). If a layer based on a snapshot in the cache has been mounted (1004), the associated snapshot ID is invalidated (removed from) the cache (1006). Monitoring continues (1008) and snapshots that are mounted are removed from the cache (1004, 1006) until done (1008), e.g., the system is shut down or reset.

Figure 11:
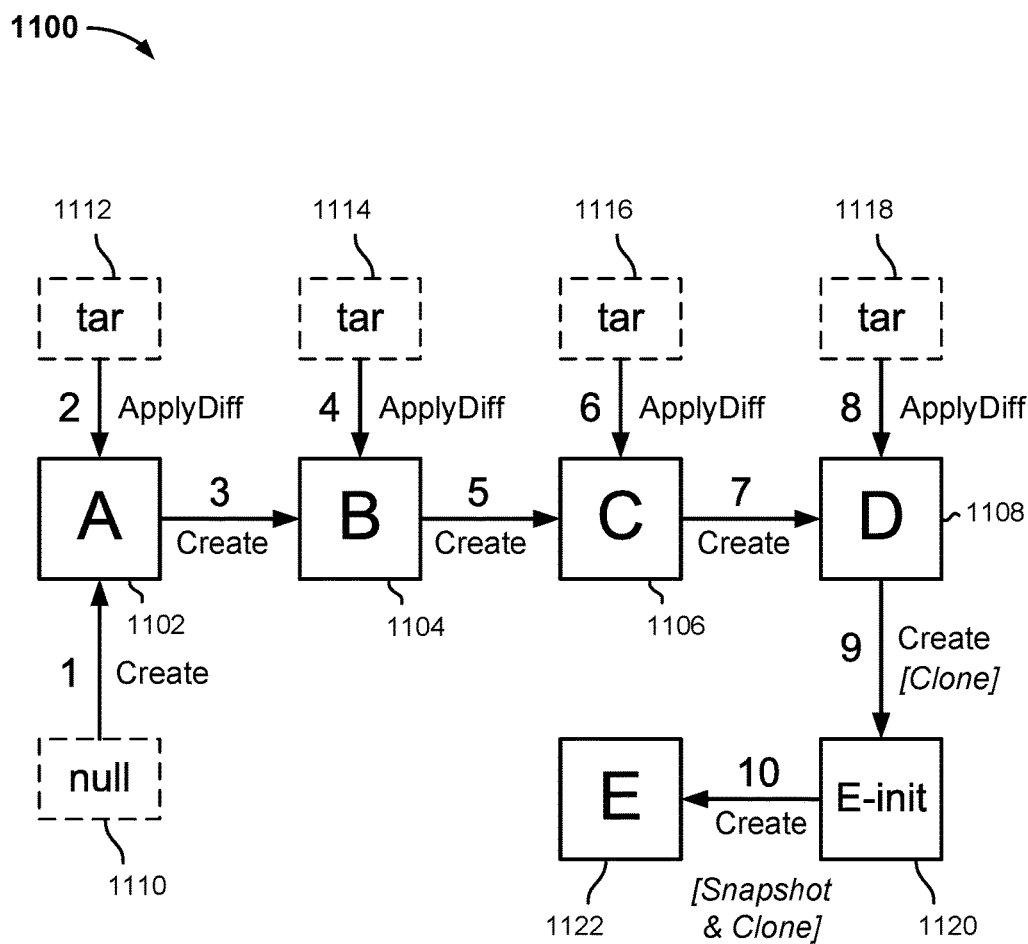
FIG. 11 is a block diagram illustrating an example of pulling and running a container based on an image in an embodiment of a containerization system as disclosed herein.

FIG. 11 is a block diagram illustrating an example of pulling and running a container based on an image in an embodiment of a containerization system as disclosed herein. In the example shown, lazy cloning and snapshot caching techniques illustrated in FIGS. 8 through 10 a used to avoid unnecessary snapshot and clone operations, without requiring and deviation from underlying Docker protocols. The example set of container operations 1100 may be required to be performed to conduct a "cold run" of a container based on a four layer image (corresponding to layers "A" through "D", 1102, 1104, 1106, and 1108, in the example as shown) that is not already present on a given Docker worker node. As illustrated by the container operations 1100 shown in FIG. 11, to run a container for the first time, a sequence of Docker primitives, specifically "Create" and "ApplyDiff" operations, must be performed. For a container based on the four layer base image illustrated in FIG. 11, a sequence of ten Create and ApplyDiff operations must be performed in the order indicated by the large numerals "1" though "10". The "Create" operation to create layer A 1102 takes a "null" parent 1110 and adds data comprising an associated tar (layer data archive) 1112 via an ApplyDiff operation. Similarly, successive layers B, C, and D (1104, 1106, 1108) are built by performing successive Create and ApplyDiff operations using associated tars 1114, 1116, and 1118. To provide a running container, Docker creates an initialization layer "E-init" 1120, to which certain initialization data is written, and in a final step the topmost layer "E" 1122 is created and mounted to provide a running instance of the container.

In an embodiment in which lazy cloning and/or a snapshot cache as described above are not used, a sequence of operations such as those shown in FIG. 11 may require that ten (10) snapshots be taken, one for each numbered Create or ApplyDiff operation, and the creation of six (6) clones, one for each Create operation. In various embodiments, however, the use of lazy cloning and a snapshot cache, as described above, enable a reduced number of snapshot and/or clone operations to be requested to be performed by the storage system. For instance, in the example shown in FIG. 11, a clone operation would not be required until creation of the initialization layer "E-init" 1120. For that layer, a clone would be required because Docker performs a "Get" operation (mount) to be able to write initialization data into the layer. A snapshot of the resulting modified E-init layer 1120, and a clone based on that snapshot, would then be performed to create and mount the topmost layer "E" 1122. In total, for the example shown in FIG. 11, lazy cloning and snapshot caching would reduce the required number of snapshots and clones to two and one, respectively. Since even a relatively uncomplicated container/image may comprise many layers, the savings in a typical deployed system and environment may be very substantial.

In various embodiments, as described above the approach disclosed herein may be implemented by representing and storing each set of container data in a single NFS file formatted as an ext4 file system. While at the storage system level data may be stored only once and remain available for use across multiple files, absent modification the in memory page cache for one file would not be visible to and/or accessible by a container associated with any other file. In various embodiments, Linux kernel modifications are made to enable at least common portions of a parent layer/file page cache to be used to cache and/or read data from the parent file.

Figure 12:
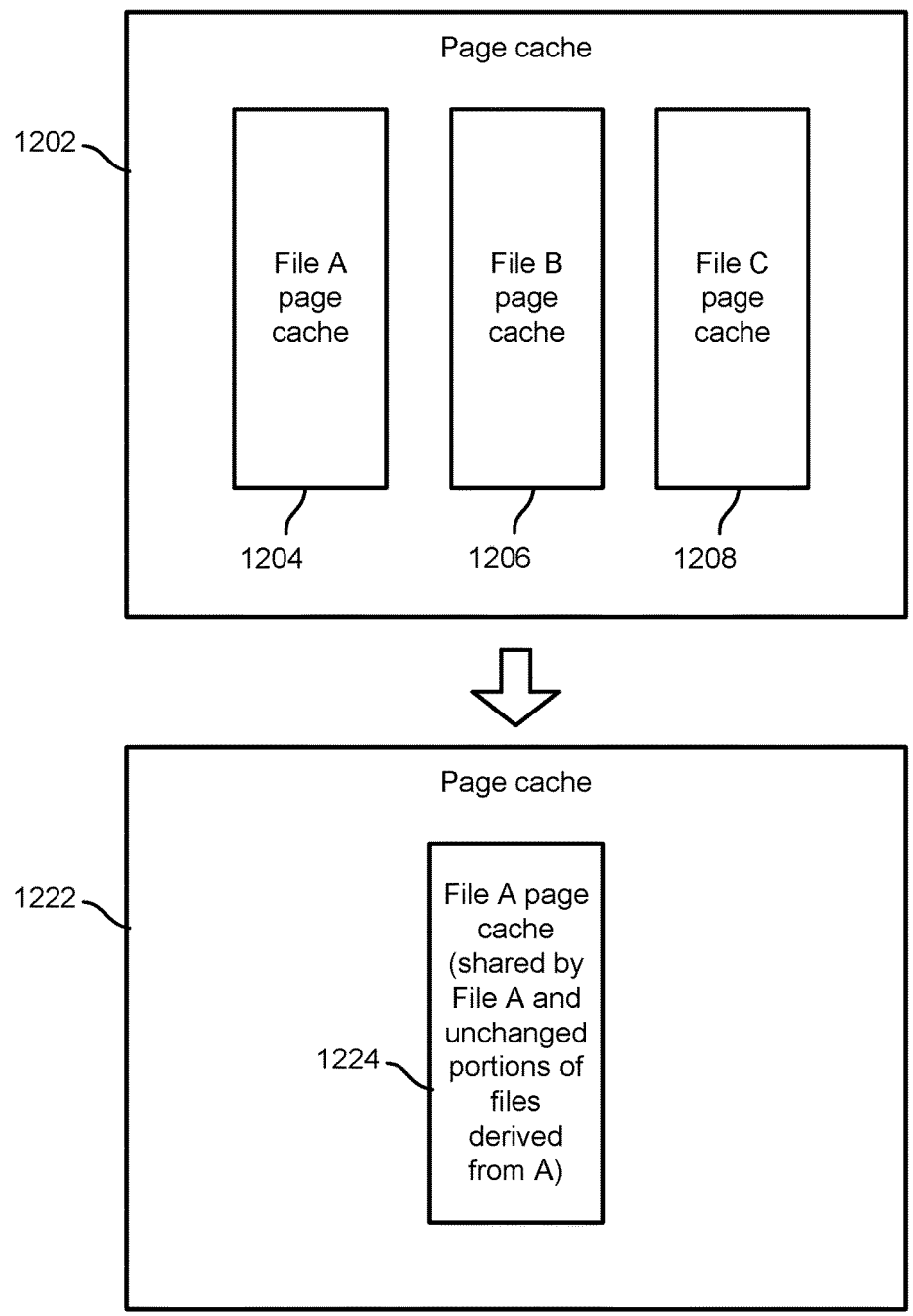
FIG. 12 is a block diagram illustrating an embodiment of a system to provide a page cache that is shared at least partially across related files.

FIG. 12 is a block diagram illustrating an embodiment of a system to provide a page cache that is shared at least partially across related files. In the example shown, the typical Linux page cache 1202 is shown to include for each file a separate page cache 1204, 1206, and 1208. In various embodiments, the Linux kernel is modified to provide a page cache 1222 that includes for at least a related set of files a shared page cache 1224 is shared at least in part across the related files. Specifically, if file B and file C are derived from file A, in various embodiments a data structure is used to make the Linux kernel, e.g., the loopback module, aware of the relationship between the files and to keep the Linux kernel apprised for each file as to which blocks may be read from and/or added to the shared cache 1224.

Figure 13:
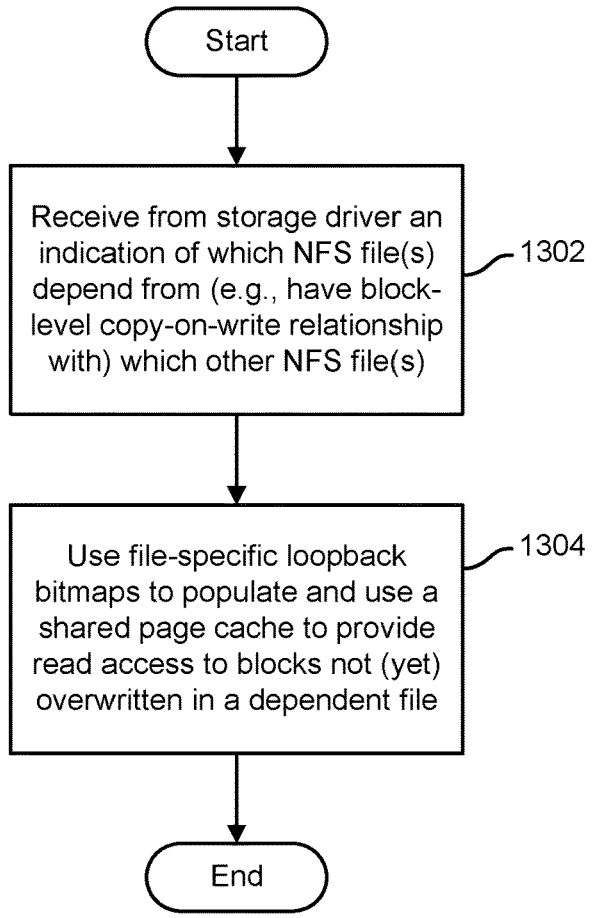
FIG. 13 is a flow chart illustrating an embodiment of a process to achieve client-side cache sharing between NFS files.

FIG. 13 is a flow chart illustrating an embodiment of a process to achieve client-side cache sharing between NFS files. In various embodiments, a loopback module comprising a Linux kernel may be modified to implement the process of FIG. 13 to provide a page cache that is shared across multiple related files, as in the example shown in FIG. 12. Referring to FIG. 13, an indication is received, for example from a containerization storage driver as described herein, as to which NFS file(s) depend from (e.g., have at the storage system a block level copy-on-write relationship with) which other NFS file(s). For example, a snapshot of a first file A may be used to create via a clone operation a second file B to create and mount an instance of a container based on an image that includes for one or more layers a snapshot ID of the snapshot of file A. Similarly, a third file C, associated with another container based on the image created using the same snapshot of file A, may be indicated by the containerization storage driver to the loopback module to be related to file A. Specifically, the loopback module may be modified to understand the information received from the containerization storage driver to indicate that file A is a parent of files B and C, in the example described above, etc. File-specific loopback bitmaps are used to populate and use a shared page cache to provide read access to blocks that have not (yet) been overwritten in a dependent (child) file (1304).

Figure 14:
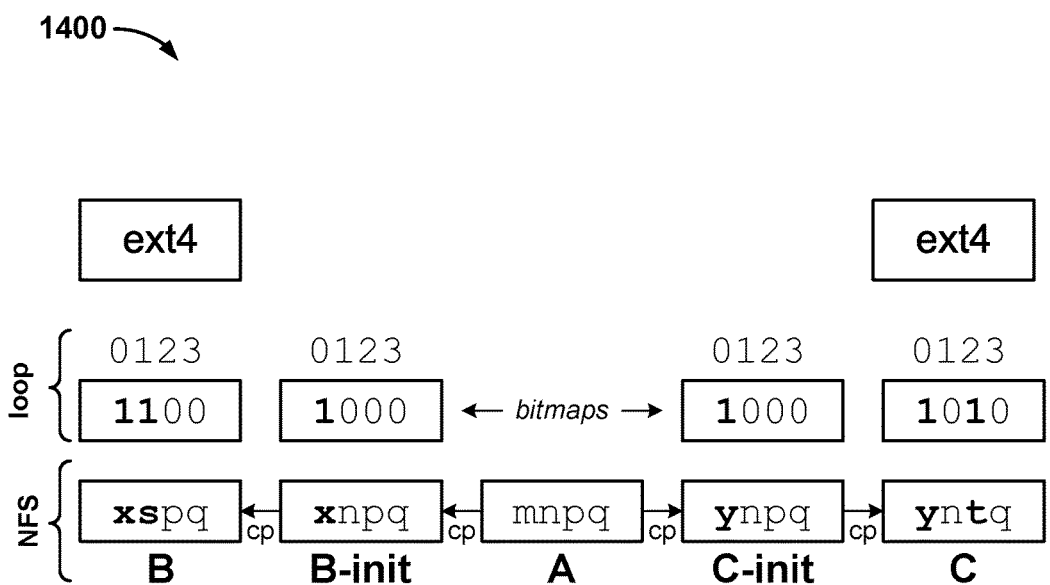
FIG. 14 is a block diagram illustrating an example of using loopback bitmaps to provide a shared page cache in an embodiment of a containerization system and environment.

FIG. 14 is a block diagram illustrating an example of using loopback bitmaps to provide a shared page cache in an embodiment of a containerization system and environment. In various embodiments, the example shown in FIG. 14 may illustrate the use of loopback bitmaps as disclosed herein by a modified loopback module and/or other Linux kernel component. In the example 1400 shown in FIG. 14, a snapshot of a parent file A is cloned to create initialization layers "B-init" and "C-init" and ultimately topmost container layers "B" and "C", each associated with a corresponding NFS file formatted as an ext4 file system, as described above. A containerization storage driver as disclosed herein may inform the modified loopback module of the parent-child relationship between the respective NFS files associated with the container layers (A, B-init, B, C-init, and C) shown. In the example shown, data values at offset 0-3 are shown for each of the files. For example, for file A, the underlying data at offsets 0-3 is represented in FIG. 14 by the letters "m", "n", "p", and "q", respectively. Bitmaps for the child files are shown, and for each child file the block-level copy-on-write relationship between the related files as represented and stored at the storage system is represented in FIG. 14 by the copy operation "cp". For the "init" layers B-init and C-init, data is shown to have been modified at offset 0. Specifically, the value at offset 0 has been changed to "x" for the B-init layer and associated NFS file, and to "y" in C-init. The change to each is reflected by setting a corresponding value at offset 0 in an associated bitmap from an initial value of "0" to "1". Likewise, layers B and C are associated with corresponding NFS files in which data at offset 2 (file/layer B) and offset 3 (file/layer C), respectively, have been changed, as reflected in each file's corresponding bitmap.

To provide a shared page cache with respect to the example shown in FIG. 14, the loopback module upon receiving a request to read offset 3 from file B, for example, may reference the bitmap for file B, see that the value is unchanged from the corresponding value in parent file A, read the data value (in this example "q") from file A, and populate the associated page cache with the value, in addition to provide the value in response to the read request. Subsequently, upon receiving a request to read the same offset from file C, the loopback module would determine from the bitmap from file C that the value has not been changed from the corresponding value in the parent file A, and upon checking the shared page cache would find the value as cached in connection with the earlier read from file B, enabling the read of file C to be fulfilled using the data as cached. By contrast, file C at offset 2 or of file B at offset 1 would be determined by the loopback module, using the respective bitmaps, to comprise data that has been changed from the corresponding data in the parent, which in this example would result in the associated offset being read from the file (B or C, as applicable) as stored on the backend storage system.

Figure 15:
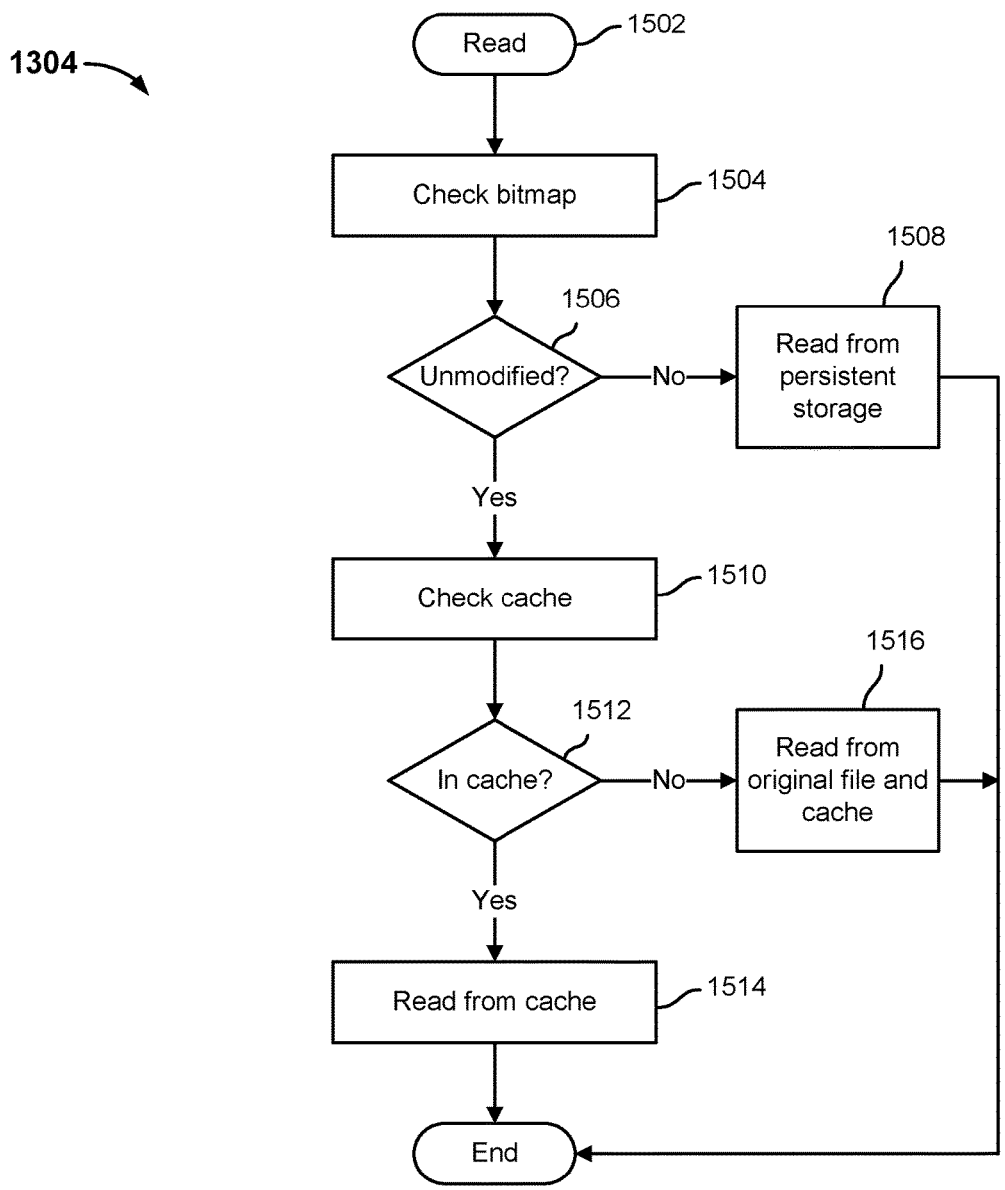
FIG. 15 is a flow chart illustrating an embodiment of a process to provide a shared page cache.

FIG. 15 is a flow chart illustrating an embodiment of a process to provide a shared page cache. In various embodiments, the process of FIG. 15 may be implemented by a modified Linux kernel, such as a modified loopback module. In the example shown, when a request is received to read a file at a given offset (1502), a corresponding bitmap (if any) is checked to determine whether the data requested to be read has been changed from a corresponding value in a parent file (1504). If the bitmap indicates the data has been modified (1506), the data is read from persistent storage (e.g., a backend storage system) (1508). If the data has not been modified (1506), a page cache associated with the parent file is checked (1510). If the requested value is in the page cache (1512) the data is read from the cache (1514). Otherwise, the data is read from the original (parent) file as stored in the backend storage and is added to the shared page cache (1516).

In various embodiments, techniques disclosed herein may be used to create, upload (push), download (pull), and run containers and/or associated images quickly and efficiently. In various examples described in detail above the Docker™ containerization platform and framework are used. However, it will be appreciated that techniques disclosed herein may be used in connection with other containerization technologies. Similarly, a modified loopback module is described above as being provided as part of a modified Linux kernel. However, other modules/components of other operating systems may similarly be modified to provide a shared page cache as disclosed herein. Any of the techniques disclosed herein, including without limitation using snapshot and cloning operations provided by an underlying backend storage system to push/pull container image data; lazy cloning; snapshot caching; and using a modified operating system component to provide a page cache that is shared across related files may be used in any combination.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication to run a container;
extracting from image data associated with the container a snapshot identifier associated with the container;
using the snapshot identifier comprising the image data associated with the container to create a clone based on a snapshot with which the snapshot identifier is associated, including by sending the snapshot identifier to a storage device and requesting that the storage device create the clone;
using data comprising the cloned snapshot to build and run the container;
using the clone to store data associated with at least a topmost layer of the container;
using a modified loopback module to provide a page cache that is shared by a file associated with said clone and a parent file associated with said snapshot; and
using a bitmap to keep track of which offsets in said file associated with said clone have been modified from a corresponding value at a corresponding offset in said parent file.

2. The method of claim 1, wherein the snapshot identifier is included in a layer data portion of the image data.

3. The method of claim 1, wherein using the clone to store data associated with at least a topmost layer of the container includes representing the container data as a single file.

4. The method of claim 3, wherein the single file comprises a Network File System (NFS) file formatted as an ext4 file system.

5. The method of claim 3, wherein using the clone to store data associated with at least a topmost layer of the container further includes using a Linux loopback to treat the single file as a virtual block device.

6. The method of claim 1, wherein the image data is created at least in part by taking said snapshot with which the snapshot identifier is associated.

7. The method of claim 1, further comprising receiving said image data and determining based on a prescribed initial portion of said image data that said image data is of a type that includes said snapshot identifier.

8. The method of claim 7, further comprising reverting to a conventional process to run the container in the event it is determined that said image data is not of the type that includes said snapshot identifier.

9. The method of claim 1, wherein the image data includes for each of a plurality of layers a corresponding layer-specific snapshot identifier, and further comprising successively storing each snapshot identifier as local metadata; and wherein said clone is created lazily for only said topmost layer of the container, using said snapshot identifier as read from said local metadata.

10. The method of claim 1, wherein said image data is created at least in part by obtaining said snapshot identifier from a snapshot cache, if available from the cache, or taking the snapshot and caching the identifier in the event the snapshot identifier is not already in the snapshot cache.

11. The method of claim 1, further comprising using the bitmap to determine whether to use the shared page cache to respond to a request to read said file associated with said clone at a given offset or to instead read the requested data from the file associated with said clone as stored in a backend storage system or device.

12. A system, comprising:
a communication interface; and
a processor coupled to the communication interface and configured to:
receive via the communication interface an indication to run a container;
extract from image data associated with the container a snapshot identifier associated with the container;
use the snapshot identifier comprising the image data associated with the container to create a clone based on a snapshot with which the snapshot identifier is associated, including by sending the snapshot identifier to a storage device and requesting that the storage device create the clone;
use data comprising the cloned snapshot to build and run the container;
use the clone to store data associated with at least a topmost layer of the container;
use a modified loopback module to provide a page cache that is shared by a file associated with said clone and a parent file associated with said snapshot; and
use a bitmap to keep track of which offsets in said file associated with said clone have been modified from a corresponding value at a corresponding offset in said parent file.

13. The system of claim 12, wherein the snapshot identifier is included in a layer data portion of the image data.

14. The system of claim 12, wherein the processor is configured to use the clone to store data associated with at least a topmost layer of the container at least in part by representing the container data as a single file.

15. The system of claim 14, wherein the single file comprises a Network File System (NFS) file formatted as an ext4 file system.

16. The system of claim 14, wherein using the clone to store data associated with at least a topmost layer of the container further includes using a Linux loopback to treat the single file as a virtual block device.

17. The system of claim 12, wherein the image data is created at least in part by taking said snapshot with which the snapshot identifier is associated.

18. A computer program product embodied in a non-transitory computer readable medium and comprising computer instructions for:

receiving an indication to run a container;

extracting from image data associated with the container a snapshot identifier associated with the container;

using the snapshot identifier comprising the image data associated with the container to create a clone based on a snapshot with which the snapshot identifier is associated, including by sending the snapshot identifier to a storage device and requesting that the storage device create the clone;

using data comprising the cloned snapshot to build and run the container;

using the clone to store data associated with at least a topmost layer of the container;

using a modified loopback module to provide a page cache that is shared by a file associated with said clone and a parent file associated with said snapshot; and using a bitmap to keep track of which offsets in said file associated with said clone have been modified from a corresponding value at a corresponding offset in said parent file.

* * * * *